United States Patent
Baron et al.

(10) Patent No.: US 9,114,560 B2
(45) Date of Patent: Aug. 25, 2015

(54) BLOWING DEVICE COMPRISING A NOZZLE AND A SUPPLY DUCT FORMING AN OBTUSE ANGLE

(71) Applicants: Alain Baron, Octeville sur Mer (FR); Frederic Lecomte, Octeville sur Mer (FR); Cedric Lemaire, Octeville sur Mer (FR)

(72) Inventors: Alain Baron, Octeville sur Mer (FR); Frederic Lecomte, Octeville sur Mer (FR); Cedric Lemaire, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 0 days.

(21) Appl. No.: 14/359,136

(22) PCT Filed: Nov. 28, 2012

(86) PCT No.: PCT/EP2012/073821
§ 371 (c)(1),
(2) Date: May 19, 2014

(87) PCT Pub. No.: WO2013/079522
PCT Pub. Date: Jun. 6, 2013

(65) Prior Publication Data
US 2014/0308386 A1    Oct. 16, 2014

(30) Foreign Application Priority Data
Dec. 1, 2011   (FR) ...................................... 11 61013

(51) Int. Cl.
*B29C 49/58*   (2006.01)
*B29C 49/12*   (2006.01)
*B29D 22/00*   (2006.01)

(52) U.S. Cl.
CPC ................. *B29C 49/12* (2013.01); *B29C 49/58* (2013.01); *B29D 22/003* (2013.01)

(58) Field of Classification Search
CPC .. B29C 49/12; B29C 49/58; B29C 2049/5803
USPC .................................................. 425/529, 535
See application file for complete search history.

(56) References Cited

U.S. PATENT DOCUMENTS 5,178,817 A * 1/1993 Yamada et al. ............... 264/532
6,796,780 B1 * 9/2004 Chatard et al. .................... 425/1

(Continued)

FOREIGN PATENT DOCUMENTS

DE     43 27 363     2/1995
FR     2 889 672     2/2007
JP     6 234152      8/1994

OTHER PUBLICATIONS

International Search Report dated Dec. 20, 2012, corresponding to PCT/EP2012/073821.

*Primary Examiner* — Robert B Davis
(74) *Attorney, Agent, or Firm* — Young & Thompson

(57) ABSTRACT

Disclosed is a blowing device (10) for forming containers (24) from thermoplastic material preforms. The device (10) includes a blowing nozzle (12) including a bottom outlet opening (28) for a pressurized blowing fluid to leave along a vertical outlet axis (28) and a single duct (14) for supplying the nozzle (12) with blowing fluid that leads into the nozzle (12), via a top supply opening (31), along an axis that is completely radial relative to the outlet axis (A2) of the nozzle (12). The blowing device is characterized in that the upstream end section of the supply duct (14) leads into the nozzle (12) along a branching axis (B) that forms an obtuse angle (a) with the outlet axis (A1) of the nozzle (12) such that the blowing fluid leaving the supply duct (14) is directed downward.

20 Claims, 4 Drawing Sheets

(56) References Cited

U.S. PATENT DOCUMENTS

| | | | |
|---|---|---|---|
| 7,033,535 B1 * | 4/2006 | Limanjaya | 264/533 |
| 7,927,093 B2 | 4/2011 | Leblond et al. | |
| 2004/0121038 A1 * | 6/2004 | Seki et al. | 425/529 |
| 2008/0213423 A1 | 9/2008 | Leblond et al. | |

* cited by examiner

BLOWING DEVICE COMPRISING A NOZZLE AND A SUPPLY DUCT FORMING AN OBTUSE ANGLE

The invention relates to a blowing device which is intended for forming containers from preforms of thermoplastic material.

The invention relates more particularly to a blowing device which is intended for forming containers from preforms of thermoplastic material, the device comprising:
- a blowing nozzle which comprises at the lower end thereof an outlet opening for a blowing fluid under pressure in accordance with a vertical outlet axis;
- a single supply duct which is for supplying the nozzle with blowing fluid and which opens in an upper inlet portion of the nozzle via an upper supply opening, the downstream end portion of the duct being generally orientated radially relative to the inlet axis of the inlet portion of the nozzle.

It is known to construct containers from thermoplastic material by blowing preforms which have been heated beforehand. The heating allows the walls of the preform to be made malleable in order to allow the forming thereof to form a final container without tearing the wall.

The forming of a final container is carried out by blowing the preform inside a mold comprising an impression in accordance with the final container.

The production of such containers in large batches is carried out by means of an installation which is provided with a large number of blowing molds. The large number of molds allows the containers to be produced at a high rate. The molds are carried, for example, by a carousel which rotates in such a manner that the preforms are blown one after the other at a high rate during their movement between an introduction location corresponding to the introduction of the preforms into an associated mold and a mold removal location corresponding to the discharge of the final container out of the mold.

The movement of the mold between the introduction location and the mold removal location thereof corresponds to a blowing cycle.

The blowing operation generally involves filling the preforms with fluid at very high pressure, for example, at 40 bar. The blowing fluid thus pushes the malleable walls of the preform against the impression of the mold, thereby allowing the final container to be formed.

This blowing operation is sometimes accompanied or preceded by a drawing operation, during which the preform is axially drawn by a sliding axial rod, referred to as an "elongation" rod, which is introduced through the neck of the preform. That mechanical drawing operation is intended to axially draw the walls of the preform while in abutment against the bottom of the preform in order to move the bottom of the preform towards the bottom of the mold. Such an operation is particularly used in the production of relatively large containers in relation to the size of the preform, such as bottles.

When it takes place before the blowing operation, the drawing operation is generally accompanied by an operation of pre-blowing the preform at a relatively low pressure, for example, 10 bar. The fluid at low pressure allows the forming of the preform to be started. It also allows the walls of the preform to be moved radially away from the elongation rod in order to prevent the material which constitutes the preform from bonding to the elongation rod and from tearing during the sliding of the elongation rod.

All those operations are carried out during a blowing cycle of very short length in order to maintain a high container production rate. To this end, the blowing fluid rate must be very high and the increase in the pressure of the fluid in the nozzle and in the preform must be very rapid.

In order to solve this problem, it is known to reduce the volume to be pressurized by modifying the length or the diameter of the supply duct, for example, by providing supply valves as close to the nozzle as possible.

However, the existing solutions are not completely satisfactory and they require a great deal of energy in order to force the fluid rate in the nozzle.

The present invention is intended to solve in particular those problems by means of a blowing device of the type described above, characterized in that the downstream end portion of the supply duct opens in the nozzle in accordance with a branching axis which forms an obtuse angle with the inlet axis of the nozzle so that the blowing fluid which is discharged from the supply duct is directed downward.

According to other features of the blowing device:
- a downstream end portion of the supply duct has a rectilinear axis;
- the inlet axis is inclined through an angle relative to the outlet axis and the nozzle has a lower outlet portion which is coaxial relative to the outlet axis;
- the inlet axis, the outlet axis and the branching axis are arranged in the same plane;
- the outlet axis of the nozzle is contained inside the inlet portion of the nozzle as far as the upper member thereof;
- at the height of the supply opening, the nozzle has a cross section whose center is transversely offset toward the supply opening relative to the outlet axis of the nozzle;
- the outlet opening has a substantially circular cross section which has a center which is coaxial relative to the outlet axis of the nozzle;
- the nozzle is delimited in an upward direction by an upper member, the supply duct opening in the nozzle and extending at least partially through the upper member;
- the supply duct opens in the nozzle and extends at least partially through a lateral wall of the nozzle;
- the device comprises a vertical elongation rod which is mounted so as to slide vertically in the nozzle through a passage which is constructed at least partially through the upper member, the elongation rod being arranged coaxially relative to the outlet axis;
- the passage of the elongation rod is constructed at least partially through a wall opposite the supply opening;
- the elongation rod is arranged in such a manner that the flux of blowing fluid supplied by the supply duct is directed directly onto the elongation rod;
- the nozzle has a cross section whose surface area progressively decreases in a downward direction along the outlet axis from the supply opening;
- the elongation rod is slidingly guided by at least one upper ring and one lower end ring, the lower end ring being arranged vertically above the supply opening;
- sealing means are interposed in the passage of the elongation rod above the supply opening in order to prevent the blowing fluid from leaking upward;
- a pressure measuring opening is arranged diametrically opposite the supply opening in the wall of the passage, below the sealing means.

Other features and advantages of the blowing device will be appreciated from a reading of the detailed description below, for the understanding of which reference may be made to the appended drawings, in which.

Figure 1:
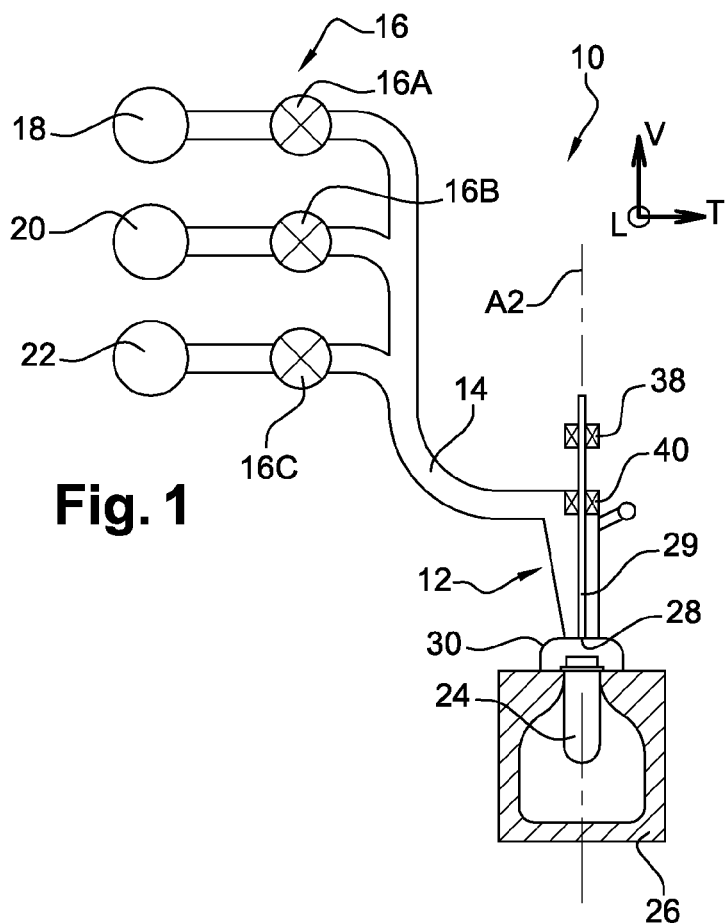
FIG. 1 is a schematic illustration of a blowing device constructed in accordance with the teachings of the invention.

Hereinafter, the following orientations will be adopted in a non-limiting manner:
- longitudinal orientation "L" directed from the rear to the front;
- vertical orientation "V" directed from the lower portion to the upper portion;
- transverse orientation "T" directed from left to right.

Hereinafter, elements having an identical structure or similar functions will be referred to using the same reference numerals. In particular, the preform 24 and the final container 24 constructed from the preform 24 by blowing will be referred to using the same reference numeral.

FIG. 1 illustrates a blowing device 10 which is constructed in accordance with the teachings of the invention. The blowing device 10 mainly comprises a nozzle 12, a single supply duct 14 for supplying fluid to the nozzle 12 and an assembly 16 of three controlled valves 16A, 16B, 16C.

The first valve 16A allows a controlled connection of a source 18 of fluid at high pressure, for example, at 40 bar, to the supply duct 14 in order to carry out a blowing operation.

The second valve 16B allows a controlled connection of a source 20 of fluid at low pressure, for example, at 10 bar, to the supply duct 14 in order to carry out a pre-blowing operation.

The high-pressure and low-pressure fluids are formed in this instance by a compressible gas such as air. In the remainder of the description, the term "blowing fluid" may equally well refer to the high-pressure fluid or the low-pressure fluid.

The third valve 16C allows a controlled connection of the supply duct 14 to a blowing fluid storage means 22 and/or to a discharge means (not illustrated).

As a result of the connection of the supply duct 14 to various sources 18, 20, the duct is sometimes referred to as a "distributor".

The blowing device 10 is intended for forming final containers 24 from preforms 24 of thermoplastic material. Such a preform 24 has been illustrated in FIG. 1. The preform 24 is in the form of a test tube having a vertical main axis "A2".

The preform 24 is introduced into the concave impression of a mold 26 so that a neck of the preform 24 projects vertically upward out of the mold 26.

The preform 24 was heated by means which are not illustrated before it was introduced into the mold 26. The material which constitutes the walls of the preform 24 is thus capable of being drawn and blown.

Figure 2:
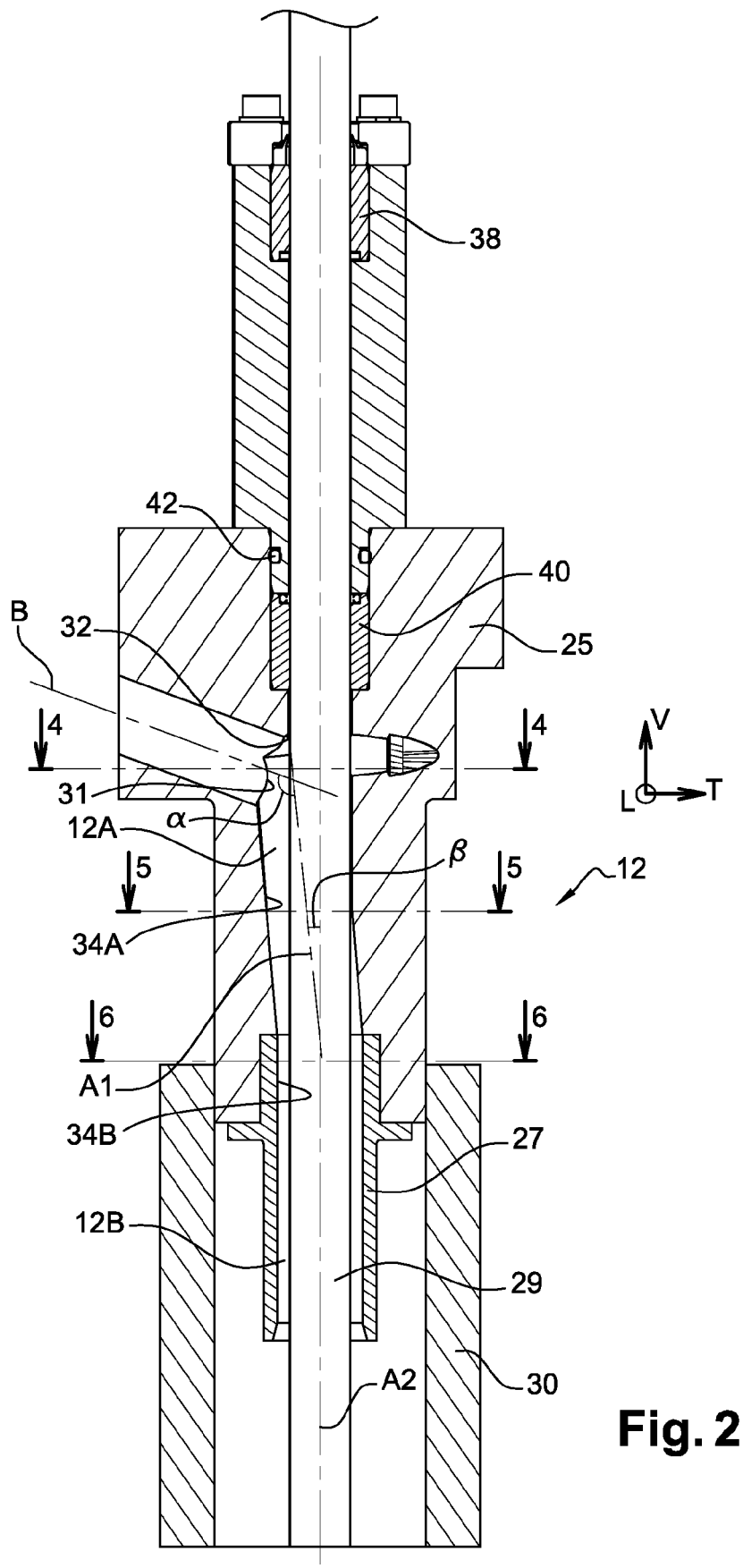
FIG. 2 is an axial section which illustrates the nozzle of the blowing device of FIG. 1.
Figure 3:
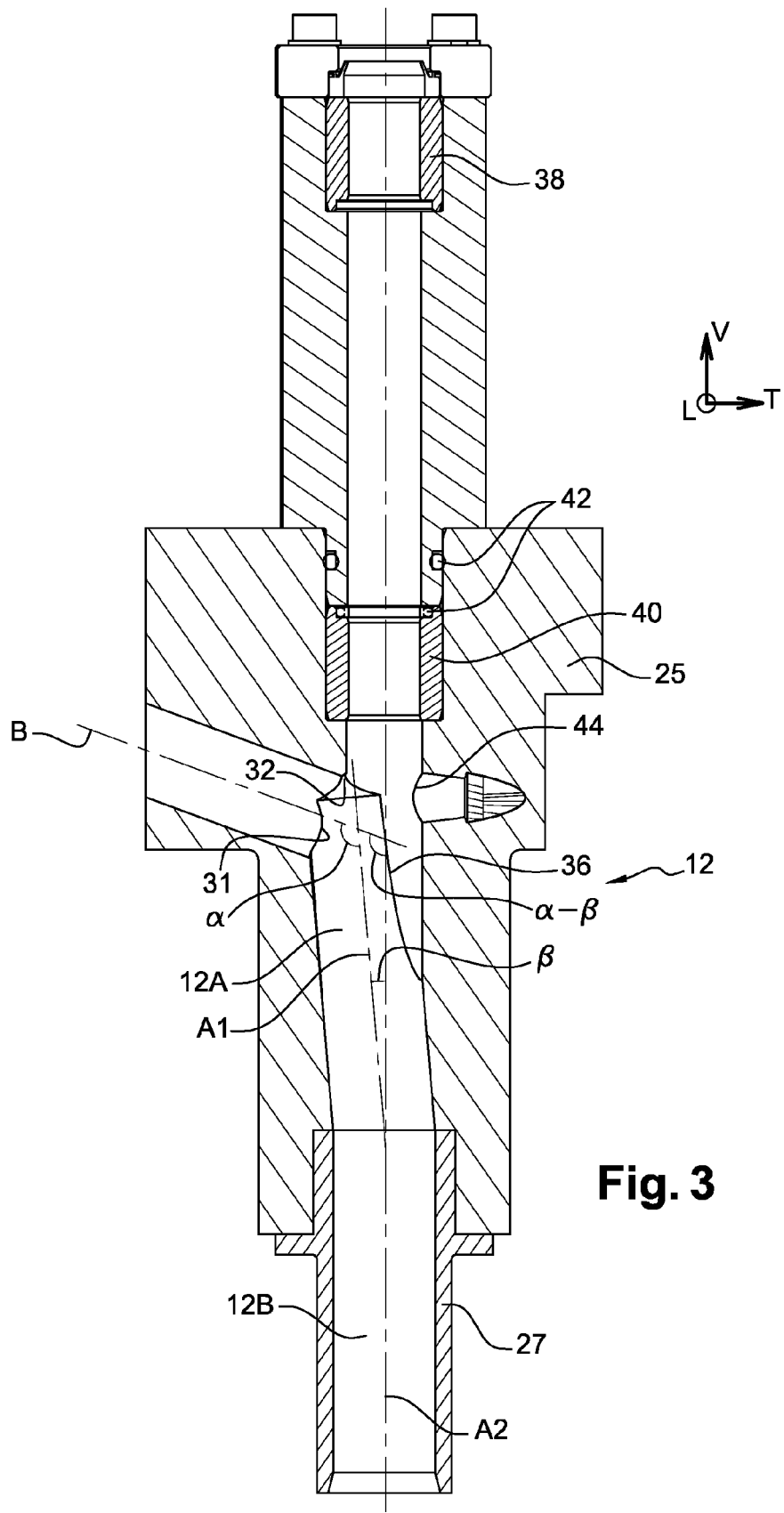
FIG. 3 is a view which is similar to that of FIG. 2 and in which the elongation rod and the bell-like member have not been illustrated.

As illustrated in FIGS. 1 to 3, the blowing nozzle 12 is a generally vertical duct. An upper end portion 12A of the nozzle 12, referred to as the inlet portion 12A, is constructed from a block 25 of metal material whilst a lower end portion 12B of the nozzle 12, referred to as an outlet portion 12B, is constructed from a tube 27 which is fixed below the block 25.

The nozzle 12 comprises at the lower end thereof an outlet opening 28 for a blowing fluid under pressure in accordance with a vertical outlet axis "A2". That outlet axis "A2" coincides with the main axis "A2" of the preform 24 when the preform 24 is received in the mold 26.

The inlet portion 12A of the nozzle 12 is delimited vertically upward by an upper member 32 and laterally in all directions by an internal wall 34A. The inlet portion 12A opens in a downward direction in the lower face of the block 25.

The outlet portion 12B is delimited laterally in all directions by an internal wall 34B which extends in continuation of the wall 34A of the inlet portion 12A.

Generally, the duct which forms the nozzle 12 does not have any shoulder type face.

The outlet opening 28 of the nozzle 12 is intended to be sealingly connected to the interior of the preform 24. To that end, in the example illustrated in FIGS. 1 and 2, the outlet opening 28 of the nozzle 12 is provided with a bell-like member 30 which is intended to be pressed in a tight manner against an upper face of the mold 26, surrounding the neck of the preform 24.

It is naturally possible to provide other sealing connection means for the nozzle 12 with respect to the preform 24.

For example, according to a variant (not illustrated) of the invention, the lower end of the nozzle is introduced inside the neck of the preform with radial interposition of a sealing joint between the internal cylindrical face of the neck and the external cylindrical face of the nozzle.

The blowing device 10 comprises a vertical elongation rod 29, of which a lower end portion is arranged inside the nozzle 12. The vertical axis of the elongation rod 29 is coaxial relative to the outlet axis "A2" of the nozzle 12. The elongation rod 29 extends vertically through the nozzle 12 over the entire height thereof.

The elongation rod 29 is mounted so as to slide vertically inside the nozzle 12 between an upper position, in which the lower end of the elongation rod 29 is intended to be arranged vertically above the bottom of the preform 24, and a lower position, in which the elongation rod 29 draws the preform 24 toward the bottom of the mold 26.

During the pre-blowing operation, the second valve 16B is initially controlled so as to take up an open position so as to supply the preform 24 with blowing fluid at low pressure via the supply duct 14 and the nozzle 12.

A drawing operation is started simultaneously or almost simultaneously with respect to the pre-blowing operation. During this drawing operation, the elongation rod 29 is controlled so as to slide toward its lower position in order to draw the preform vertically downward.

At the end of the pre-blowing operation, the second valve 16B is closed.

The blowing operation is then started. The first valve 16A is then controlled so as to take up an open position so as to supply the preform 24 with fluid at high pressure via the supply duct 14 and the nozzle 12. Subsequently, the first valve 16A is closed.

Finally, during a discharge or degassing operation, the third valve 16C is controlled so as to take up an open position in order to allow the residual blowing fluid contained in the final container 24 to be discharged via the nozzle 12 and the supply duct 14. That last operation allows equalization of the pressure inside the final container 24 with respect to atmospheric pressure in order to be able to separate the nozzle 12 from the final container 24 without producing any resonating noise owing to an uncontrolled discharge of the residual blowing fluid.

The blowing device 10 according to the invention has been produced in such a manner as to promote a subsonic flow of the blowing fluid, in particular in order to prevent the formation of shock waves and so as to reduce losses of pressure. The volume of the nozzle 12 has also been reduced in order to prevent needless expenditure of energy in order to increase the pressure of the blowing fluid inside the nozzle 12.

Reference may be made to FIGS. 2 and 3 for the description of the nozzle 12 and the arrangement of the supply duct 14.

The single supply duct 14 for supplying the nozzle 12 with blowing fluid opens in an upper portion of the nozzle 12, near the upper member 32, by means of an upper supply opening 31. The nozzle 12 comprises a single supply opening 31. The downstream end portion of the supply duct 14 opens in the nozzle 12 in accordance with a branching axis "B" which generally extends radially relative to the inlet axis "A1" of the nozzle 12. The axis "B" extends more particularly in a transverse vertical plane which extends through the inlet axis "A1" of the nozzle 12.

The downstream end portion of the supply duct 14 is produced in this instance from a common block 25 of material with respect to the nozzle 12.

As illustrated in FIGS. 2 and 3, the inlet portion 12A is not arranged coaxially relative to the outlet portion 12B. The inlet portion 12A of the nozzle 12 extends in accordance with an inlet axis "A1" which is inclined through an angle "β" in a vertical transverse plane in the direction of the supply opening 31 relative to a position which is coaxial relative to the outlet axis "A2". In this manner, the inlet axis "A1" extends in a plane defined by the outlet axis "A2" and the branching axis "B". The angle "β" is not zero.

The angle "β" is, for example, between 1° and 70°. The angle "β" is preferably less than or equal to 50°. According to a preferred configuration, the angle "β" is less than or equal to 30°.

Figure 7A:
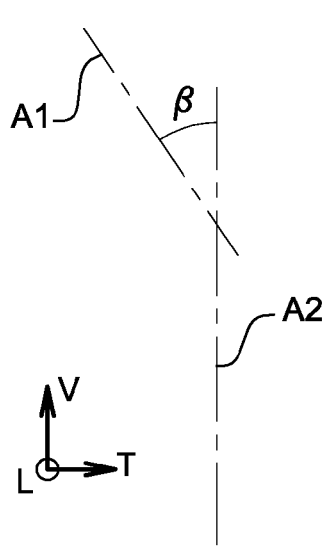
FIG. 7A is a front view which schematically illustrates the inlet and outlet axes which are arranged in accordance with the teachings of the invention.
Figure 7B:
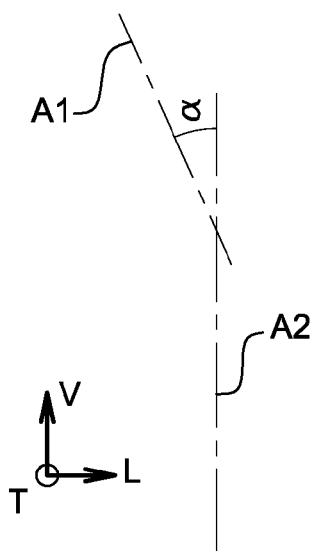
FIG. 7B is a side view which schematically illustrates the inlet and outlet axes arranged in accordance with a variant of the invention.

In a variant which is schematically illustrated in FIG. 7, in addition to the transverse inclination thereof, the axis "A1" is inclined through the angle "γ" in a vertical longitudinal plane relative to the axis "A2" in such a manner that the outlet axis "A2" is not contained in the plane defined by the branching axis "B" and the inlet axis "A1". The angle "γ" is, for example, between 0° and 70°. The angle "γ" is preferably less than 50°.

In order to minimize the occurrences of turbulence in the flow of the blowing fluid, the branching axis "B" is not arranged at right angles relative to the inlet axis "A1". The branching axis "B" forms an obtuse angle "α" with the inlet axis "A1" of the nozzle 12 so that the blowing fluid which is discharged from the supply duct 14 is directed downward. In this manner, that connection at an obtuse angle "α" reduces or eliminates the occurrences of turbulence and/or losses of pressure and/or shock waves during the passage of the flux of blowing fluid from the supply duct 14 to the nozzle 12.

The occurrences of turbulence, losses of pressure and shock waves are also reduced or eliminated when the pressurized fluid moves from the container 24 toward the storage means 22 during the discharge operation.

The valves 16A, 16B, 16C are arranged upstream of the downstream end portion of the supply duct 14.

In the embodiment illustrated in FIGS. 2 and 3, the downstream end portion of the supply duct 14 has a rectilinear axis "B" and it has a substantially circular cross section.

The supply duct 14 opens more particularly in the nozzle 12 and extends partially through a transverse end portion of the upper member 32, which portion is illustrated on the right in FIGS. 2 and 3. The supply duct 14 opens in the nozzle 12 and also extends partially through the cylindrical wall 34A of the inlet portion 12A of the nozzle 12. The supply duct 31 thus straddles the upper member 32 and the cylindrical wall 34A of the nozzle 12.

The branching axis "B" and the inlet axis "A1" are not coaxial. In this manner, the axis "B" forms an angle "α-β" (angle "α" minus angle "β") with the outlet axis "A2". The inclination of the axis "B" relative to the inlet axis "A1", then the inclination of the inlet axis "A1" relative to the outlet axis "A2" allow the flux of blowing fluid to be progressively brought in the direction of the outlet axis "A2" with very little loss of pressure, turbulence and very few shock waves.

The angle "α-β" is, for example, greater than or equal to 110° and less than or equal to 160°. The angle "α-β" is preferably less than or equal to 130°.

The inlet portion 12A and the outlet portion 12B both have a cross section of passage of the same external diameter, the cross section being taken in a manner orthogonal relative to the axis "A1" and "A2", respectively.

In a variant which is not illustrated, the diameter of the inlet portion is different from the diameter of the outlet portion. In this case, in order to prevent the production of turbulence and shock waves, a convergent member or a divergent member is interposed between the two inlet and outlet portions.

Figure 4:
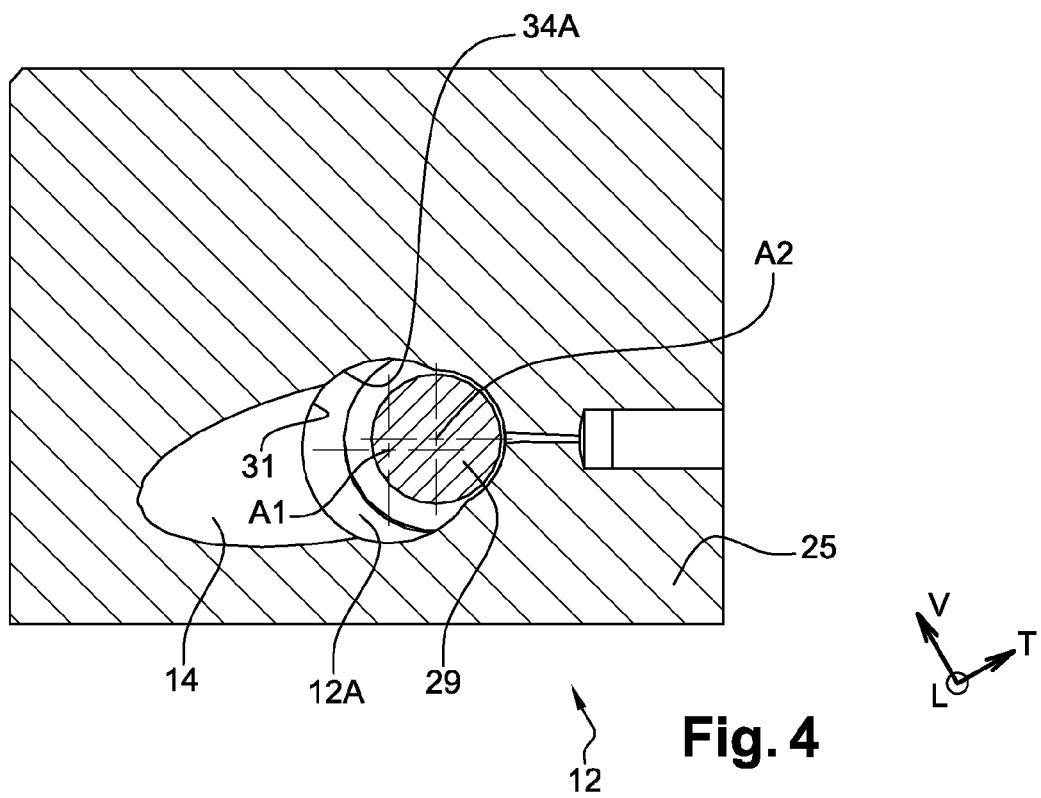
FIG. 4 is a horizontal section in accordance with the plane of section 4-4 of FIG. 2, illustrating the cross section of the nozzle at the height of the branching with the supply duct.
Figure 6:
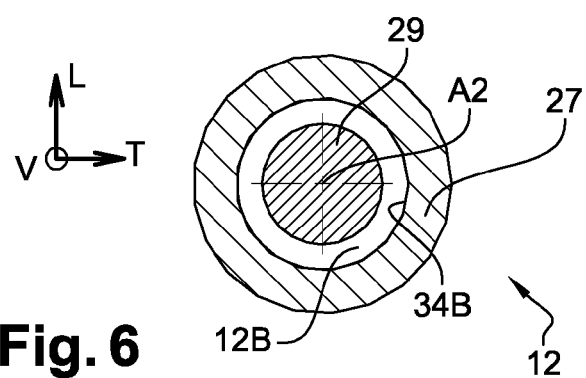
FIG. 6 is a horizontal section in accordance with the plane of section 6-6 of FIG. 2, illustrating the cross section of the nozzle at the height of the lower end of the inlet portion thereof.

As illustrated in FIG. 6, the center of the cross section arranged at the lower end of the inlet portion 12A is coaxial with respect to the outlet axis "A2" while, as illustrated in FIG. 4, the center "A1" of the cross section arranged at the upper end of the inlet portion 12A is transversely offset to the left relative to the outlet axis "A2".

In this instance, the angle "β" is defined so that the outlet axis "A2" is contained inside the inlet portion 12A at least up to the height of the supply opening 31. In this instance, the outlet axis "A2" extends out of the inlet portion 12A and passes through the upper member 32.

The elongation rod 29 is mounted so as to slide vertically in the nozzle 12 through a passage 36 which is constructed at least partially through the upper member 32. The passage 36 is in the form of a chimney having a vertical axis which is coaxial relative to the outlet axis "A2".

As a result of the diameter of the elongation rod 29, the passage is also constructed partially in a portion of the wall 34A of the inlet portion 12A which is diametrically opposite the supply opening 31. As illustrated in FIG. 3, the intersection between the passage 36 and the wall 34A of the inlet portion 12A extends from the upper member 32 as far as approximately half of the height of the inlet portion 12A.

Figure 5:
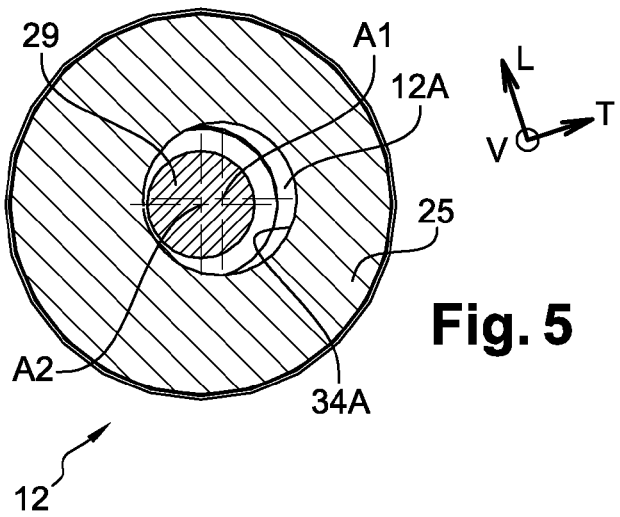
FIG. 5 is a horizontal section in accordance with the plane of section 5-5 of FIG. 2, illustrating the cross section of the nozzle generally at half the height of the inlet portion thereof.

As illustrated in FIGS. 4 to 6, the lower end portion of the elongation rod 29 has a circular cross section of constant diameter. The diameter of the elongation rod 29 is less than the diameter of the outlet opening 28 so that the blowing fluid passes through the annular gap which is radially reserved between the elongation rod 29 and the internal cylindrical wall 34B of the outlet portion 12B.

The inlet portion 12A of the nozzle 12 has a horizontal cross section of passage of the fluid, the surface-area of which decreases progressively from the supply opening 31 as far as half the height of the inlet portion 12A. This is because, as illustrated in FIG. 4, at the height of the supply opening 31, a portion of the circular cross section of the elongation rod 29, here substantially half of the cross section, occupies the horizontal cross section of the inlet portion 12A. During movement down the inlet portion 12A, the cross section of the elongation rod 29 occupies more and more of the horizontal cross section of passage of the fluid, until it is completely contained inside the cross section of passage of the fluid, at half of the height of the inlet portion 12A, as illustrated in FIG. 5.

In this manner, the cross section of passage of the fluid decreases as a result of the presence of the elongation rod 29. That progressive decrease of the cross section of passage allows a smooth acceleration of the flow speed of the blowing fluid from the upper region toward the lower outlet opening 28. That further allows a progressive distribution of the flux of blowing fluid around the elongation rod 29, preventing occurrences of turbulence.

As a result of the presence of the elongation rod 29 and as illustrated in FIG. 2, the flux of blowing fluid opens directly on the rod 29 which is substantially parallel with the outlet axis "A2" of the nozzle 12 while the wall portion 34A which is arranged directly below the supply opening 31 has a gradient inclined at an angle "β" in relation to the outlet axis "A2" of the nozzle 12. In the upper half of the inlet portion 12A, the flux of blowing fluid therefore opens in a free volume without any impediment.

The wall portion 34B which is arranged directly below the supply opening 31 is transversely spaced apart from the elongation rod 29 in the upper portion thereof, in order to move closer during travel in a downward direction as far as the lower end of the inlet portion 12A.

The shape and the surface area of the horizontal cross section of the outlet portion 12B of the nozzle remain constant over the entire height thereof. The cross section of passage of the fluid is therefore in the form of a ring which is coaxial relative to the outlet axis "A2" which surrounds the elongation rod 29.

The flux of blowing fluid supplied by the supply duct 14 is directed directly toward the elongation rod 29 at the angle "α-β". In this manner, the flux of blowing fluid slides downward along the elongation rod 29, taking advantage of the free space between the wall 34A of the inlet portion 12A and the elongation rod 29.

The elongation rod 29 is guided so as to slide vertically by at least one upper ring 38 and one lower end ring 40.

In a general manner, in a nozzle 12 produced in accordance with the teachings of the invention, the lower end ring 40 is arranged vertically above the supply opening 31 of the supply duct 14 with the nozzle 12. In this manner, the lower end ring 40 is not arranged in the path of the flux of blowing fluid. This prevents losses of pressure, occurrences of turbulence and other shock waves.

To that end, the nozzle 12 has a sufficiently short length for the elongation rod 29 to be able to be guided, preventing the lower end portion thereof from flexing under the effect of buckling, particularly when the elongation rod 29 draws the preform 24.

In the embodiment of the invention which is illustrated in the figures, the lower end ring 40 is arranged above the upper member of the nozzle 12. A housing is formed in the upper face of the block 25 in order to receive the lower end ring 40.

It is known to associate with the guiding rings 38 or 40 sealing means 42 which are intended to prevent the blowing fluid from leaving the nozzle 12 in an upward direction.

A pressure measuring opening 44 is arranged diametrically opposite the supply opening 31 in a wall of the passage 36 of the elongation rod 29. The pressure measuring opening 44 is arranged below the sealing means 42 so that some blowing fluid can be introduced in the sliding gap reserved radially between the passage 36 and the elongation rod 29. In this manner, the elongation rod 29 is interposed between the supply opening 31 and the pressure measuring opening 44. In a surprising manner, it has been found that this arrangement allows measurement of a generating pressure which is approximately equal to the mean generating pressure of the blowing fluid inside the nozzle 12.

Furthermore, the pressure measuring opening 44 is arranged with spacing from the flux of blowing fluid. Such an arrangement advantageously prevents the pressure measuring opening 44 from disrupting the flow of the flux of blowing fluid.

During the blowing step or pre-blowing step, the blowing fluid is introduced into the nozzle 12 via the supply duct 14. The flux of blowing fluid descends vertically along the elongation rod 29 in order to reach the outlet opening 28 at very high speed which is slightly less than the speed of sound.

In the upper portion of the nozzle 12, the flux of blowing fluid occupies the space which is between the wall 34A of the inlet portion 12A and the elongation rod 29. When it arrives at the outlet opening 28, the flux of blowing fluid occupies in a homogeneous manner the entire cross section of the nozzle 12.

Except for the elongation rod 29, between the supply opening 31 and the outlet opening 28, the nozzle 12 does not comprise any impediment capable of disrupting the flow of the blowing fluid. This is particularly because of the arrangement of the lower end ring 40 above the supply opening 31. In this manner, no edge or curvature is capable of causing inside the nozzle 12 a shock wave which is linear, oblique or a result of pressure reduction.

As a result of the arrangement of the lower end ring 40 above the supply opening 31, the nozzle 12 is very short in a vertical direction. This advantageously allows the provision of a nozzle 12 with a relatively small volume which allows a very rapid increase in pressure of the blowing fluid in the nozzle 12.

Furthermore, the supply duct 14 is advantageously connected to the valves 16A, 16B, 16C, providing a route which reduces the disruptions of the flow of the blowing fluid and which prevents losses of pressure and shock waves. The supply duct 14 has, for example, a mean axis which is rectilinear or optionally curvilinear and in which the minimum radii of curvature are configured to ensure a fluid connection of the different ducts for a harmonious flow of the blowing fluid.

The invention claimed is:

1. A blowing device (10) for forming containers (24) from preforms of thermoplastic material, the device (10) comprising:
   a blowing nozzle (12) which comprises at the lower end thereof an outlet opening (28) for a blowing fluid under pressure along a vertical outlet axis (A2); and
   a single supply duct (14) which is for supplying the nozzle (12) with blowing fluid and which opens in an upper inlet portion (12A) of the nozzle (12) via an upper supply opening (31), the downstream end portion of the duct (14) being generally orientated along the inlet axis (A1) of the inlet portion (12A) of the nozzle (12), the inlet axis (A1) forming a non-zero angle (β) with the vertical outlet axis (A2),
   wherein the downstream end portion of the supply duct (14) opens in the nozzle (12) along a branching axis (B) which forms an obtuse angle (α) with the inlet axis (A1) of the nozzle (12) so that the blowing fluid which is discharged from the supply duct (14) is directed downward.

2. The device (10) as claimed in claim 1, wherein a downstream end portion of the supply duct (14) has a rectilinear axis (B).

3. The device (10) as claimed in claim 1, wherein the non-zero angle (β) is between 1 degree and 70 degrees, an angle α–β is from 110 degrees to 160 degrees, and the nozzle (12) has a lower outlet portion (12B) which is coaxial relative to the outlet axis (A2).

4. The device (10) as claimed in claim 3, wherein the inlet axis (A1), the outlet axis (A2) and the branching axis (B) are arranged in the same plane.

5. The device (10) as claimed in claim 4, wherein the outlet axis (A2) of the nozzle (12) is contained inside the inlet portion (12A) of the nozzle (12) as far as the upper member (32) thereof.

6. The device (10) as claimed in claim 3, wherein, at the height of the supply opening (31), the nozzle (12) has a cross section whose center is transversely offset toward the supply opening (31) relative to the outlet axis (A2) of the nozzle (12).

7. The device (10) as claimed in claim 3, wherein the outlet opening (28) has a substantially circular cross section which has a center which is coaxial relative to the outlet axis (A2) of the nozzle (12).

8. The device (10) as claimed in claim 1, wherein the nozzle (12) is delimited in an upward direction by an upper member (32), and in that the supply duct (14) opens in the nozzle (12) and extends at least partially through the upper member (32).

9. The device (10) as claimed in claim 1, wherein the supply duct (14) opens in the nozzle (12) and extends at least partially through a lateral wall (34B) of the nozzle (12).

10. The device (10) as claimed in claim 1, further comprising a vertical elongation rod (29) which is mounted so as to slide vertically in the nozzle (12) through a passage (36) which is constructed at least partially through the upper member (32), the elongation rod (29) being arranged coaxially relative to the outlet axis (A2).

11. The device (10) as claimed in claim 10, wherein the passage (36) of the elongation rod (29) is constructed at least partially through a wall (34B) opposite the supply opening (31).

12. The device (10) as claimed in claim 11, wherein the elongation rod (29) is arranged in such a manner that the flux of blowing fluid supplied by the supply duct (34) is directed directly onto the elongation rod (29).

13. The device (10) as claimed in claim 1, wherein the nozzle (12) has a cross section whose surface area progressively decreases in a downward direction along the outlet axis (A2) from the supply opening (31).

14. The device (10) as claimed in claim 10, wherein the elongation rod (29) is slidingly guided by at least one upper ring (38) and one lower end ring (40), the lower end ring (40) being arranged vertically above the supply opening (31).

15. The device (10) as claimed in claim 10, wherein sealing means (42) are interposed in the passage (36) of the elongation rod (29) above the supply opening (31) in order to prevent the blowing fluid from leaking upward.

16. The device (10) as claimed in claim 1, wherein a pressure measuring opening (44) is arranged diametrically opposite the supply opening (31) in the wall of the passage (36), below the sealing means (42).

17. The device (10) as claimed in claim 2, wherein the nozzle (12) has a lower outlet portion (12B) which is coaxial relative to the outlet axis (A2).

18. The device (10) as claimed in claim 4, wherein, at the height of the supply opening (31), the nozzle (12) has a cross section whose center is transversely offset toward the supply opening (31) relative to the outlet axis (A2) of the nozzle (12).

19. The device (10) as claimed in claim 5, wherein, at the height of the supply opening (31), the nozzle (12) has a cross section whose center is transversely offset toward the supply opening (31) relative to the outlet axis (A2) of the nozzle (12).

20. The device (10) as claimed in claim 4, wherein the outlet opening (28) has a substantially circular cross section which has a center which is coaxial relative to the outlet axis (A2) of the nozzle (12).

* * * * *